(12) United States Patent
York

(10) Patent No.: US 11,562,083 B2
(45) Date of Patent: Jan. 24, 2023

(54) DATA ACCESS MANAGEMENT FOR A COMPOSITION

(71) Applicant: HEWLETT PACKARD ENTERPRISE DEVELOPMENT LP, Houston, TX (US)

(72) Inventor: Justin E. York, Cypress, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 737 days.

(21) Appl. No.: 16/048,475

(22) Filed: Jul. 30, 2018

(65) Prior Publication Data
US 2020/0034556 A1    Jan. 30, 2020

(51) Int. Cl.
| | | |
|---|---|---|
| *G06F 21/62* | (2013.01) | |
| *H04L 29/06* | (2006.01) | |
| *H04L 9/08* | (2006.01) | |
| *H04L 9/40* | (2022.01) | |

(52) U.S. Cl.
CPC .............. *G06F 21/62* (2013.01); *H04L 9/088* (2013.01); *H04L 9/0869* (2013.01); *H04L 63/108* (2013.01)

(58) Field of Classification Search
CPC ..... H04L 63/108; H04L 9/088; H04L 9/0869; H04L 63/062; H04L 63/068; H04L 9/12; H04L 9/16; H04L 9/083; G06F 21/62
See application file for complete search history.

(56) References Cited

U.S. PATENT DOCUMENTS

| | | |
|---|---|---|
| 9,152,814 B1 | 10/2015 | Natanzon |
| 2003/0099360 A1 | 5/2003 | Hoang |
| 2005/0111668 A1* | 5/2005 | Raikar .................. H04L 9/0891 380/278 |

(Continued)

FOREIGN PATENT DOCUMENTS

WO    WO-2016068942 A1 *    5/2016    ........... H04L 9/0643

OTHER PUBLICATIONS

Lee, C.C. et al.; "Timebound keyaggregate encryption for cloud storage"; Feb. 19, 2016; 16 pages.

(Continued)

*Primary Examiner* — Joseph P Hirl
*Assistant Examiner* — Thomas A Gyorfi
(74) *Attorney, Agent, or Firm* — Hewlett Packard Enterprise Patent Department

(57) ABSTRACT

Systems and methods provide a transient component limited access to data in a composition. One method includes receiving a request for the transient component to access data in the composition. The composition may include permanent components operable to utilize encryption keys generated at selected intervals from a seed value shared by the permanent components. The encryption keys utilized by the permanent components at each selected interval may be identical to one another. The method also includes generating a set of encryption keys from the seed value for a specified period of time. The set of encryption keys may be identical to the encryption keys to be utilized by the permanent components at the selected intervals to occur during the specified period of time. The method further includes granting the transient component access to data in the composition for the specified period of time via the set of encryption keys.

20 Claims, 5 Drawing Sheets

(56) References Cited

U.S. PATENT DOCUMENTS

| | | | |
|---|---|---|---|
| 2012/0221854 A1* | 8/2012 | Orsini | H04L 63/0876 |
| | | | 713/167 |
| 2013/0086661 A1* | 4/2013 | Roth | H04L 9/3242 |
| | | | 726/7 |
| 2015/0178724 A1* | 6/2015 | Ngo | G06Q 20/327 |
| | | | 705/71 |
| 2016/0218866 A1* | 7/2016 | Patil | H04L 9/0833 |
| 2017/0054603 A1 | 2/2017 | Kulkarni et al. | |
| 2017/0195303 A1* | 7/2017 | Smith | H04W 12/0431 |
| 2019/0044973 A1* | 2/2019 | Deutsch | H04L 63/1466 |
| 2019/0372758 A1* | 12/2019 | Tevosyan | H04L 9/3213 |

OTHER PUBLICATIONS

Paterson, K.G. et al.; "Time-specific Encryption"; Jun. 16, 2010; 19 pages.

Xiong, J. et al.: "A Secure Data Self-destructing Scheme in Cloud Computing"; 2014; 14 pages.

* cited by examiner

DATA ACCESS MANAGEMENT FOR A COMPOSITION

BACKGROUND

Interconnects are the physical connections between computer processors and the peripheral components of a computer, such as memory and disk drives. Interconnects provide the communication channels that enable computer processors to direct the operation of these peripheral components. The peripheral component interconnect express (PCIe) is an example interconnect used in many computers. However, the PCIe limits how memory can be used, thus introducing inefficiencies that limit how quickly computer processors can process data.

Accordingly, a type of interconnect, referred to as a "memory semantic fabric", has been developed. Memory semantic fabrics make it possible to increase the rate at which computer processors can read and write data in comparison to the PCIe. Memory semantic fabrics may be useful in multi-processor computer systems, such as the systems in datacenters that are used for applications like cloud computing and artificial intelligence. Memory semantic fabrics may permit components (e.g., memory and computer processors) traditionally fixedly attached to one another in a single enclosure to instead individually connect to a memory semantic fabric spanning one or more enclosures, where the components may be operatively coupled to form one or more functional computing systems (e.g., servers).

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
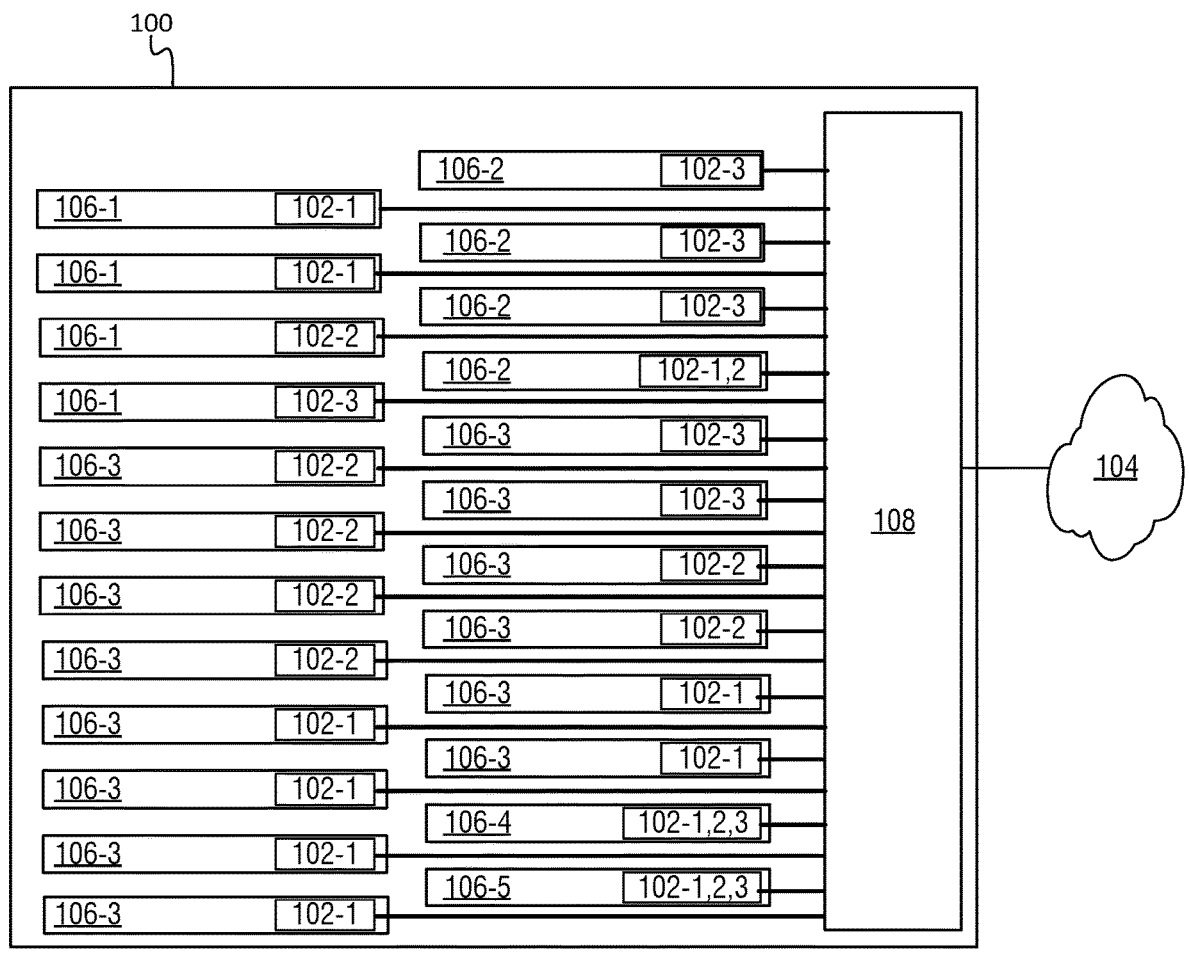
FIG. 1 is a schematic of an example circuit board including a plurality of compositions formed in part via a network, according to one or more examples of the disclosure.

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Generally, a memory semantic fabric allows for the creation of one or more computing systems (e.g., servers) via the connection of a plurality of components to the memory semantic fabric as peer devices. Example components may include, but are not limited to, memory, computer processors, field programmable gate arrays (FPGAs), input/output devices, and the like. In some examples, the memory semantic fabric may include a circuit board including a plurality of slots to receive and connect the components thereto, and a fabric switch to interconnect every slot. Multiple circuit boards may be interconnected via the respective embedded fabric switches. The flexible architecture of the memory semantic fabric allows for facile interchangeability of the components and thus allows for users to fine tune the constructed computing systems to meet their desired performance capabilities.

To construct the components into a functional computing system via the memory semantic fabric, a processing unit may be used to group (i.e., operatively couple) the components to form the desired computing system, which will be referred to hereinafter as a composition. The processing unit may configure the components to be communicatively coupled with one another over the memory semantic fabric and may provide the components with a shared encryption key to ensure data transmitted between the components is secure.

In some instances, once implemented, the shared encryption key is unaltered. Based on the flexibility of the memory semantic fabric architecture, certain components (e.g., serial console and keyboard video mouse (KVM) components) may be shared between several compositions in the memory semantic fabric. Accordingly, although a serial console and KVM component may only necessitate access to the registers pertaining to video, serial, keyboard, and a mouse, the serial console and KVM component may be granted access to other components, such as memory, storage, and computer processors, within the same composition. Thus, in such instances, the serial console and KVM component may have full read or read/write access to every other component in the memory semantic fabric. Such access provides a tremendous vulnerability in the memory semantic fabric ecosystem.

Accordingly, examples of the present disclosure are directed to systems and methods for providing a transient component limited access to data in a composition including a plurality of permanent components. Components may be identified as transient components or permanent components on the basis of the access of each component to other compositions. In some examples, components with access to a single composition may be identified as permanent components. Accordingly, components with access to a plurality of compositions in a memory semantic fabric may be identified as transient components.

The plurality of permanent components may utilize encryption keys generated at selected intervals to maintain data communication between the permanent components. In one or more examples, the encryption keys are generated by an algorithm and seed value shared between the permanent components. As the encryption keys concurrently utilized by the permanent components at each interval are identical, data communication may be maintained therebetween. In the event the transient component desires access to data in the composition, a request for access to data in the composition by the transient component may be made and a determination may be made as to the specified time and duration of the access to be granted to the transient component. A set of encryption keys may be generated including encryption keys to be used by the transient component at the time and for the duration of the access. Accordingly, the set of encryption keys include encryption keys generated before their use in receiving access to data in the composition. The encryption keys of the set of encryption keys may be identical to the encryption keys to be utilized by the permanent components at the intervals occurring during the specified amount of time provided for access of the transient component to the composition.

More particularly, in one example of the present disclosure, a computer-implemented method for providing a transient component limited access to data in a composition is provided. The computer-implemented method may include receiving a request for the transient component to access data in the composition. The composition may include a plurality of permanent components. Each permanent component may be operable to utilize respective encryption keys generated at selected intervals from a seed value shared by the plurality of permanent components. The encryption keys utilized by the plurality of permanent components at each selected interval may be identical to one another. The computer-implemented method may also include generating a set of encryption keys from the seed value for a specified period of time. The set of encryption keys may be identical to the encryption keys to be utilized by the permanent components at the selected intervals to occur during the specified period of time. The computer-implemented method may further include granting the transient component access to data in the composition for the specified period of time via the set of encryption keys.

In another example of the present disclosure, a data access management system is provided and may include a network interface, a non-transitory computer-readable medium, and one or more processors communicatively coupled to the non-transitory computer-readable medium and the network interface. The non-transitory computer-readable medium may store instructions, that when executed by the one or more processors, cause the one or more processors to: receive a request from a first component to access data in a composition formed from a plurality of second components, each of the second components operable to utilize an encryption key generated at selected intervals based on a seed value shared by each of the second components, the encryption keys of the second components being identical at each selected interval to maintain data communication between the second components; generate a set of encryption keys to match the encryption keys to be utilized by the second components at a plurality of intervals of the selected intervals; and transmit the set of encryption keys to the first component to provide the first component access to data in the composition for a specified period of time aligning with the plurality of intervals.

In another example of the present disclosure, a non-transitory computer-readable medium is provided and stores computer-executable instructions, which when executed, cause a processor to: receive a request from a first component to access data in a composition formed from a plurality of second components, each of the second components operable to utilize an encryption key generated at selected intervals based on a seed value common to each of the second components, the encryption keys of the second components being identical at each selected interval to maintain data communication between the second components; generate a set of encryption keys to match the encryption keys to be utilized by the second components at a plurality of intervals of the selected intervals; and transmit the set of encryption keys to the first component to provide the first component access to data in the composition for a specified period of time aligning with the plurality of intervals.

Turning now to the drawings, FIG. 1 is a schematic of an example circuit board 100 including a plurality of compositions 102-1 through 102-3 (also referred to collectively as compositions 102 or individually and generally as a composition 102) formed in part via a network 104, according to one or more examples of the disclosure. Although the circuit board is illustrated as having three compositions 102, it will be appreciated that more than three or fewer than three compositions 102 may be included in the circuit board 100 while remaining within the scope of the present disclosure.

The circuit board 100 may be or may be a part of a printed circuit board, such as a motherboard, disposed in a server chassis (not shown) mountable to a server rack (also not shown). In some examples, the circuit board 100 may be one of a plurality of circuit boards, where each circuit board may be disposed in a respective server chassis. In other examples, multiple circuit boards may be disposed in a single server chassis. In either event, each server chassis may be mounted in the server rack in a stacked arrangement, where a plurality of server chassis may be stacked above and below one another.

Each of the compositions 102 may include a plurality of components 106-1 through 106-5 (also referred to collectively as components 106 or individually and generally as a component 106) interconnected with one another to form the respective composition 102. The plurality of components 106 may be interconnected with one another via the network 104. In one or more examples, the network 104 may be or may be part of a memory semantic fabric. In the example illustrated in FIG. 1, each of the components 106 may have a standardized connection end (not shown) inserted into a respective slot (not shown) of the circuit board 100. To ensure compatibility and ease of interchangeability, each slot may be identically sized and configured to receive therein the standardized connection end of each component 106. Each of the slots may be communicatively coupled to a fabric switch 108 embedded or otherwise coupled to the circuit board 100. In some examples, the fabric switch 108 of the circuit board 100 may be communicatively coupled to one or multiple other fabric switches of other circuit boards, such that the fabric switches and the accompanying slots of each circuit board form the network 104.

The components 106 may include, but are not limited to, a plurality of compute components 106-1, a plurality of graphical processing units (GPUs) 106-2, a plurality of memory modules 106-3, a storage drive 106-4, and a serial console and/or KVM component 106-5. In one or more examples, each compute component 106-1 may be or may include a central processing unit (CPU). In other examples, one or more of the components 106, such as the serial console and KVM component 106-5, may include a CPU. As used herein, a CPU is a general-purpose computer processor that may execute the instructions of a computing job. A GPU is a type of computer processor that may be referred to as a hardware accelerator. Hardware accelerators may be configured to perform specific types of operations more efficiently than a general-purpose CPU. For example, GPUs were originally developed to perform computer operations specific to image processing. GPUs are thus useful for reducing the processing times of software that produces graphics, such as video games. However, GPUs have proven to be useful in other applications, such as in the field of artificial intelligence.

The plurality of components 106 may vary in number and kind based on the composition 102 and the performance characteristics desired. As shown in FIG. 1, the plurality of compositions 102 includes a first composition 102-1, a second composition 102-2, and a third composition 102-3. The first composition 102-1 may be formed from a plurality of components 106 including two compute components 106-1, one GPU 106-2, six memory modules 106-3, one storage unit 106-4, and one serial console and KVM component 106-5. The second composition 102-2 may be formed from a plurality of components 106 including one compute component 106-1, one GPU 106-2, six memory modules 106-3, one storage unit 106-4, and one serial console and KVM component 106-5. The third composition 102-3 may be formed from a plurality of components 106 including one compute component 106-1, three GPUs 106-2, two memory modules 106-3, one storage unit 106-4, and one serial console and KVM component 106-5.

Figure 2:
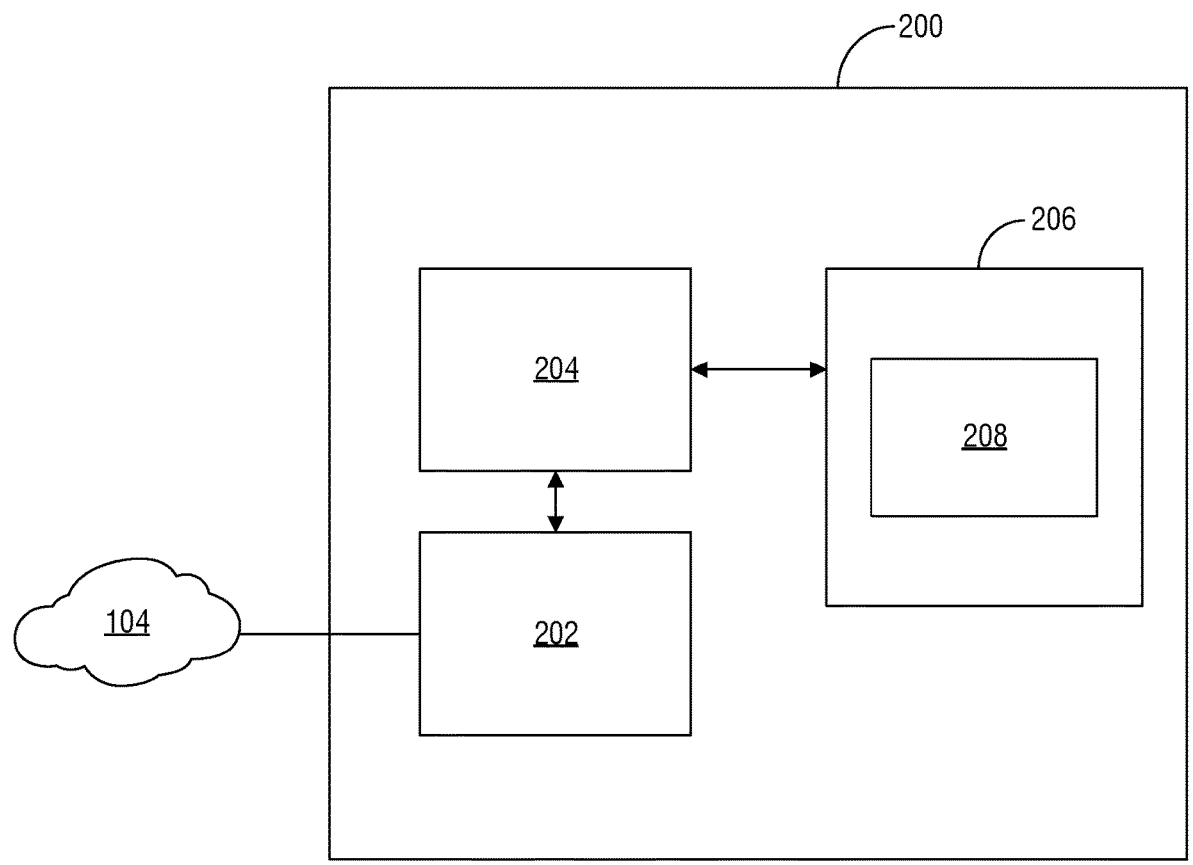
FIG. 2 is a block diagram of an example data access management system communicatively coupled to the network, according to one or more examples of the disclosure.

Each of the components 106 of the first composition 102-1, the second composition 102-2, and the third composition 102-3 may be grouped (i.e., operatively coupled) via the network 104 to form the respective composition 102 to perform as constructed. In one or more examples, each composition 102 may be a server or like computing system. Referring now to FIG. 2 with continued reference to FIG. 1, FIG. 2 illustrates a block diagram of an example data access management system 200 communicatively coupled to the network 104, according to one or more examples of the present disclosure. The data access management system 200 may be programmed (e.g., software) or otherwise configured (e.g., hardware) to group each of the components 106 of the first composition 102-1, the second composition 102-2, and the third composition 102-3 to form the respective composition 102 to perform as constructed.

In addition to grouping the components 106 into each of the respective compositions 102, the data access management system 200 may identify each of the components 106 as a permanent component or a transient component. The identification of the components 106 as permanent components or transient components may be based on the access provided to each of the components 106 of the composition 102. For example, as illustrated in FIG. 1, the storage drive 106-4 and the serial console and KVM component 106-5 are each shared by each of the first composition 102-1, the second composition 102-2, and the third composition 102-3. Accordingly, the storage drive 106-4 and the serial console and KVM component 106-5 may be identified as transient components by the data access management system 200. Each of the compute components 106-1 and the memory modules 106-3, on the other hand, are provided access only to one of the first composition 102-1, the second composition 102-2, and the third composition 102-3. Accordingly, the compute components 106-1 and the memory modules 106-3 may be identified as permanent components by the data access management system 200.

Based on the identification of the components 106 as permanent components or transient components, the data access management system 200 may determine whether to provide the respective components 106 encryption keys or access to an algorithm and seed value. The algorithm and seed value may be utilized to generate the encryption keys implemented to secure data transmitted between the components 106 of the respective compositions 102, as generally, the encryption of the secured data (i.e., encrypted data) is dependent on access to the appropriate encryption key. In one or more examples, the components 106 identified as permanent components may be provided a common seed value and an algorithm utilizing the common seed value to generate encryption keys at selected intervals. In other examples, the data access management system 200 may generate the encryption keys at the selected intervals utilizing the common seed value and the algorithm. In either event, the encryption keys may be temporary, such that the validity of the encryption keys are limited to the respective intervals for which each encryption key is generated.

The selected intervals may be equally spaced in one or more examples. The selected intervals may be based on the algorithm and may be, for example, every minute, every five minutes, every thirty minutes, or every hour. It will be appreciated that the selected intervals may be less than every minute or greater than every hour and may be dependent, for example, on the desired performance characteristics of the composition 102.

A common seed value may be utilized to ensure the algorithm generates a common encryption key for each permanent component at each interval. By doing so, each permanent component is able to communicate via the transmission of data with one another in the respective composition 102. The common seed value may take a multitude of forms and, in one example, may be a string of random prime numbers.

The algorithm may be any algorithm capable of generating encryption keys for the components 106 of the composition 102. For example, the algorithm may be an encryption algorithm, such as a time-specific encryption algorithm, known to those of ordinary skill in art to generate transaction integrity keys (TIKs). However, the present disclosure is not limited thereto, and any algorithm capable of generating encryption keys in the manner set forth herein is contemplated to be within the scope of the present disclosure.

The one or more components 106 identified as transient components are prevented by the access management system 200 from receiving the algorithm and seed value provided in some examples to each of the permanent components. By preventing the transient components) from receiving the algorithm and seed value, the transient components) are unable to generate the appropriate encryption keys and thus are denied access to the composition 102 unless the appropriate encryption keys are provided to the transient component(s). Thus, as provided in examples of the present disclosure, the data access management system 200 may provide the transient components) with limited access to data in the composition 102. By doing so, access to data in the composition 102 by the transient component(s) may be limited to a time and duration controlled by the data access management system 200. This limited access may eliminate or substantially reduce the vulnerability in the composition 102 to impermissible access by an undesired entity having access to the transient component(s).

In examples set forth herein, to provide limited access to data in a composition 102 by a transient component, the data access management system 200 may generate a set of encryption keys. The data access management system 200 may generate the set of encryption keys based on a request for access to data in the composition 102 by the transient component. In one or more examples, based on the request, the data access management system 200 may determine the time at which the transient component may access the composition 102 and the specified amount of time to grant the transient component access to the composition 102. In another example, the request may include a time to access the composition 102 and a specified amount of time to access the composition 102. Upon determining the amount of time and the time at which to provide the access to the transient component, the data access management system 200 may generate a set of encryption keys.

The number of encryption keys in the set of encryption keys may depend on the specified amount of time provided to access the composition 102 and the number of intervals occurring during the specified period of time as determined by the algorithm accessible to the permanent components. For example, if the algorithm provides that an encryption key for each permanent component is generated every five minutes and the specified period of time to grant the transient component access to the composition 102 is thirty minutes, then the set of encryption keys generated by the data access management system 200 and transmitted to the transient component will total six encryption keys.

Figure 3:
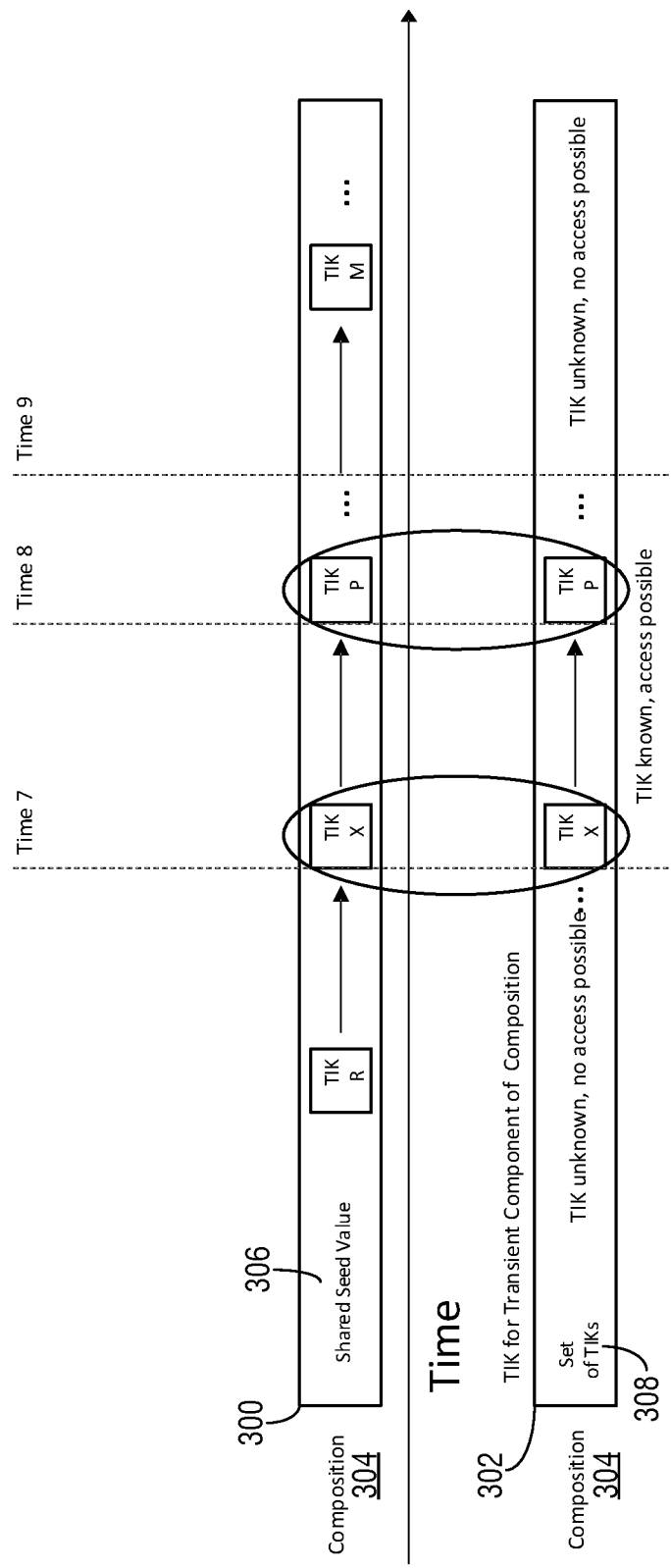
FIG. 3 is a schematic of the accessibility of an example permanent component and an example transient component to data in an example composition at various intervals of time, according to one or more examples of the disclosure.

Each encryption key of the set of encryption keys will match the respective encryption key generated at the respective interval and utilized by a permanent component. Turning now to FIG. 3 with continued reference to FIGS. 1 and 2, FIG. 3 illustrates the accessibility of an example permanent component 300 and an example transient component 302 to data in an example composition 304 at various intervals of time, according to one or more examples of the disclosure. The permanent component 300 as identified by the data access management system (shown in FIG. 2, 200) is provided the encryption keys (TIK R, TIP X, and TIP P in FIG. 3) at the respective intervals associated with times 7, 8, and 9, or a seed value 306 and algorithm to generate an encryption key TIK at each of the intervals.

The transient component 302, on the other hand, does not have access to the algorithm or the seed value 306 and thus cannot generate encryption keys TIK for the composition. To attain access, a request for the transient component 302 to access data in the composition 304 is transmitted to the data access management system 200. In the example illustrated in FIG. 3, the data access management system 200 determines the transient component 302 will be provided access to the composition 304 for the intervals corresponding to time 7 and time 8. Prior to and after intervals corresponding to time 7 and time 8, the transient component 302 is denied access to the data in the composition 304.

Upon receiving the request to grant to the transient component 302 access to data in the composition 304 and prior to the intervals corresponding to time 7 and time 8, the data access management system 200 may generate a set of encryption keys (set of TIKs 308) including a first encryption key (TIK X) for the interval corresponding to time 7 and a second encryption key (TIK P) for the interval corresponding to time 8. At the interval corresponding to time 7, the permanent component 300 may generate, or receive from the data access management system 200, an encryption key (TIK X). The first encryption key (TIK X) provided to the transient component 302 is identical to the encryption key (TIK X) generated by the permanent component 300 (or received by the permanent component 300 from the data access management system 200) at the interval corresponding to time 7, thus providing access to the data in the composition 304 by the transient component 302. At the next interval corresponding to time 8, the permanent component 300 may generate, or receive from the data access management system 200, another encryption key (TIK P). The pre-generated second encryption key (TIK P) provided to the transient component 302 is identical to the encryption key (TIK P) generated by the permanent component 300 (or received by the permanent component 300 from the data access management system 200) at the interval corresponding to time 8, thus providing continued access to the composition 304 by the transient component 302. At the next interval corresponding to time 9, the permanent component 300 may generate, or receive from the data access management system 200, another encryption key (TIK M); however, as illustrated in the example of FIG. 3, the data access management system 200 did not provide in the set of encryption keys an encryption key (TIK M) for the interval corresponding to time 9, thus the transient component 302 is denied access to data in the composition 304.

Returning now to FIG. 2 with continued reference to FIG. 1, the data access management system 200 may include a network interface 202 communicatively coupled to the network 104, one or more processors 204 (one shown), and a non-transitory computer-readable medium 206 communicatively coupled to the processor(s) 204 and the network interface 202 and storing instructions 208 that when executed by the processor(s) 204, in part, provide one or more transient components limited access to data in a composition 102. To that end, the processor(s) 204 may be integrated in a single component 106 of a composition 102 or distributed across components 106 of the composition 102. The non-transitory computer-readable storage medium 206 may be integrated in the same component 106 as the processor(s) 204, or the non-transitory computer-readable storage medium 206 may be separate but accessible to that component 106 and the processor(s) 204. In an example, the non-transitory computer-readable storage medium 206, the processor(s) 204, or a combination thereof, may be implemented in any of the components 106 of the composition 102. Alternatively, or in addition, the non-transitory computer-readable storage medium 206 and the processor(s) 204 may be implemented in a controller (not shown) connected to the components 106 of the composition 102, and that controls the functionalities and operation of the data access management system 200.

In one example, the stored instructions 208 can be part of an installation package that when installed can be executed by the processor(s) 204 to implement the data access management system 200. In this case, the non-transitory computer-readable storage medium 206 may be a portable medium such as a compact disc (CD), digital video disc (DVD), or flash drive or a memory maintained by a server from which the installation package can be downloaded, or installed. In another example, the stored instructions 208 may be part of an application or applications already installed. Here, the non-transitory computer-readable storage medium 206 can include integrated memory such as hard drive, solid state drive, and the like.

Figure 4:
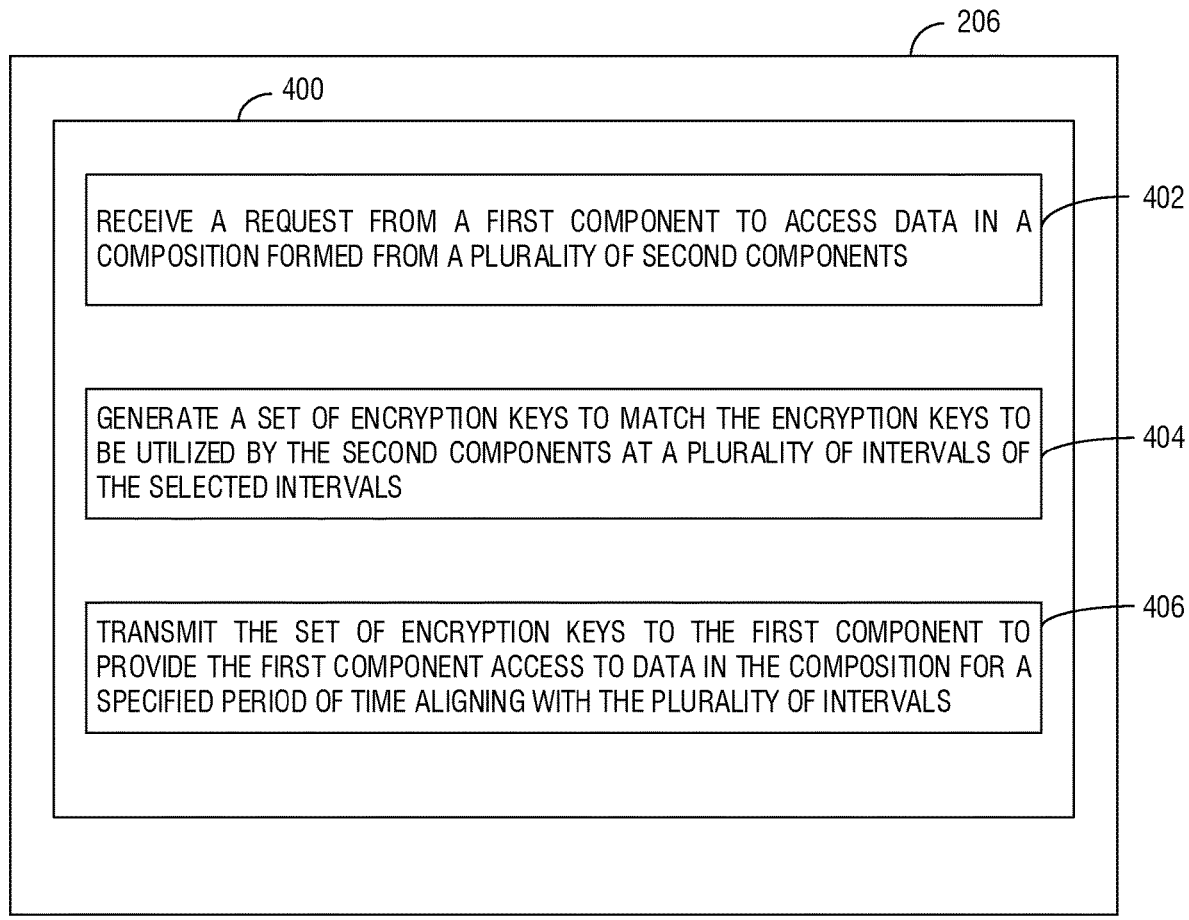
FIG. 4 is a block diagram of example instructions stored on a non-transitory computer-readable medium, according to one or more examples of the disclosure.

FIG. 4 is a block diagram of example instructions 400 stored on the non-transitory computer-readable medium 206 of FIG. 2, according to one or more examples of the disclosure. The processor 204 and the implementation of the data access management system 200 via the execution of the instructions 400 stored on the non-transitory computer-readable storage medium 206 may now be discussed in the context of FIGS. 1 and 2. The implementation begins with instructions executable by the processor 204 to receive a request from a first component 106 to access data in a composition 102 formed from a plurality of second components 106, as at instruction block 402. Each of the second components 106 may be operable to utilize an encryption key generated at selected intervals based on a seed value common to each of the second components 106. The encrytion keys of the second components 106 may be identical at each selected interval to maintain data communication between the second components 106.

As at instruction block 404, the non-transitory computer-readable storage medium 206 may include instructions executable by the processor 204 to generate a set of encryption keys to match the encryption keys to be utilized by the second components 106 at a plurality of intervals of the selected intervals. As at instruction block 406, the non-transitory computer-readable storage medium 206 may include instructions executable by the processor 204 to transmit the set of encryption keys to the first component 106 to provide the first component 106 access to data in the composition 102 for a specified period of time aligning with the plurality of intervals.

Figure 5:
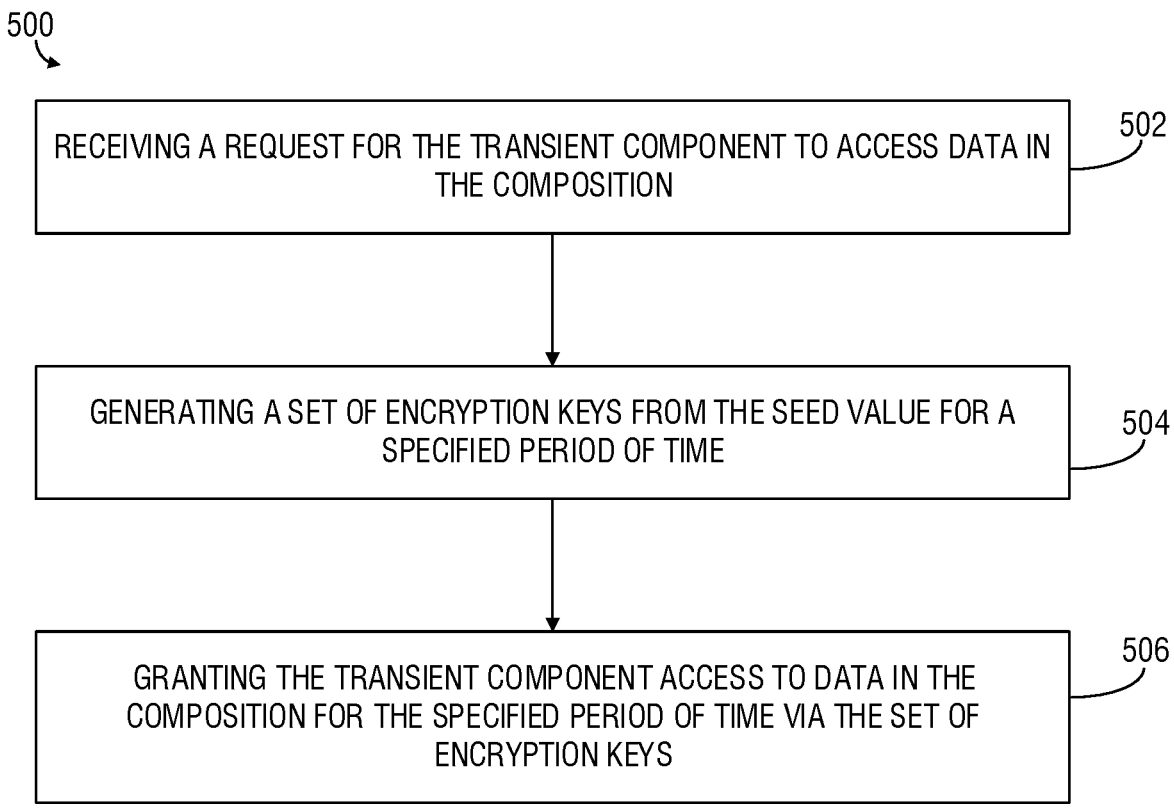
FIG. 5 is a flowchart depicting a computer-implemented method for providing a transient component limited access to data in a composition, according to one or more examples of the disclosure.

FIG. 5 is a flowchart depicting a computer-implemented method 500 for providing a transient component limited access to data in a composition, according to one or more examples of the disclosure. In discussing FIG. 5, reference is made to the block diagrams of FIGS. 1 and 2 to provide contextual examples. Implementation, however, is not limited to those examples.

As shown in FIG. 5, the computer-implemented method 500 may start at block 502 and may include receiving a request for the transient component to access data in the composition 102. The composition 102 may include a plurality of permanent components. Each permanent component may be operable to utilize respective encryption keys generated at selected intervals from a seed value shared by the plurality of permanent components. The encryption keys utilized by the plurality of permanent components at each selected interval may be identical to one another. As at block 504, the computer-implemented method 500 may also include generating a set of encryption keys from the seed value for a specified period of time. The set of encryption keys may be identical to the encryption keys to be utilized by the permanent components at the selected intervals to occur during the specified period of time. The computer-implemented method 500 may further include granting the transient component access to data in the composition 102 for the specified period of time via the set of encryption keys, as at block 506.

As provided above, examples in the present disclosure may be directed to a non-transitory computer-readable medium storing computer-executable instructions and executable by one or more processors of the computer via which the computer-readable medium is accessed. A computer-readable media may be any available media that may be accessed by a computer. By way of example, such computer-readable media may comprise random-access memory (RAM), read-only memory (ROM), electrically erasable programmable read-only memory (EEPROM), compact disc read-only memory (CD-ROM) or other optical disk storage, magnetic disk storage or other magnetic storage devices, or any other medium that may be used to carry or store desired program code in the form of instructions or data structures and that may be accessed by a computer. Disk and disc, as used herein, includes CD, laser disc, optical disc, DVD, floppy disk and Blu-ray® disc where disks usually reproduce data magnetically, while discs reproduce data optically with lasers.

Note also that the software implemented aspects of the subject matter claimed below are usually encoded on some form of program storage medium or implemented over some type of transmission medium. The program storage medium is a non-transitory medium and may be magnetic (e.g., a floppy disk or a hard drive) or optical (e.g., a CD-ROM), and may be read only or random access. Similarly, the transmission medium may be twisted wire pairs, coaxial cable, optical fiber, or some other suitable transmission medium known to the art. The claimed subject matter is not limited by these aspects of any given implementation.

Furthermore, examples disclosed herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A computer-implemented method for providing a transient component limited access to data in a composition, comprising:
   receiving an encryption key at each of a plurality of intervals from a seed value shared by a plurality of permanent components, wherein a permanent component comprises a component having access to one composition, wherein the composition comprises a group of components that form a desired computing system;
   receiving a request for the transient component to access data in the composition, wherein the transient component comprises a component having access to a plurality of compositions and having limited access to the seed value;
   generating a matching encryption key at selected intervals of the plurality of intervals to be utilized at the transient component, wherein each matching encryption key is identical to the encryption key received for the interval;
   providing the matching encryption keys to the transient component during the selected intervals; and
   granting the transient component access to data in the composition for the specified period of time via the set of encryption keys.

2. The computer-implemented method of claim 1, wherein the transient component is communicatively coupled to at least one other composition.

3. The computer-implemented method of claim 2, wherein the composition is a first server, and the at least one other composition includes a second server.

4. The computer-implemented method of claim 1, further comprising:
   denying the transient component access to data in the composition outside of the specified period of time.

5. The computer-implemented method of claim 1, further comprising:

during the specified period of time, generating, via the plurality of permanent components or a processor communicatively coupled to each of the permanent components, the encryption keys at the plurality of intervals occurring during the specified period of time.

6. The computer-implemented method of claim 5, wherein:
the processor is communicatively coupled to the transient component; and
the processor is operable to generate the set of encryption keys from the seed value for the specified period of time.

7. The computer-implemented method of claim 6, further comprising:
transmitting the set of encryption keys to the transient component from the processor;
utilizing, concurrently, a first encryption key of the set of encryption keys from the transient component and a first encryption key of the plurality of permanent components at a first of the plurality of intervals occurring during the specified period of time, the first encryption key of the set of encryption keys and the first encryption key of the plurality of permanent components being identical to one another; and
utilizing, concurrently, a second encryption key of the set of encryption keys from the transient component and a second encryption key of the plurality of permanent components at a second of the plurality of intervals occurring during the specified period of time, the second encryption key of the set of encryption keys and the second encryption key of the plurality of permanent components being identical to one another.

8. The computer-implemented method of claim 5, wherein generating the set of encryption keys from the seed value for the specified period of time is carried out prior to the specified period of time.

9. The computer-implemented method of claim 1, wherein:
the permanent components are communicatively coupled with one another via a network; and
the permanent components and the transient component are communicatively coupled during the specified period of time via the network.

10. A data access management system comprising:
a network interface;
a non-transitory computer-readable medium; and
one or more processors, communicatively coupled to the non-transitory computer-readable medium and the network interface, wherein the non-transitory computer-readable medium stores instructions, that when executed by the one or more processors, cause the one or more processors to:
receive an encryption key at each of a plurality of intervals from a seed value shared by a plurality of permanent components, wherein a permanent component comprises a component having access to one composition, wherein the composition comprises a group of components that form a desired computing system;
receive a request for the transient component to access data in the composition, wherein the transient component comprises a component having access to a plurality of compositions and having limited access to the seed value;
generate a matching encryption key at selected intervals of the plurality of intervals to be utilized at the transient component, wherein each matching encryption key is identical to the encryption key received for the interval;
provide the matching encryption keys to the transient component during the selected intervals; and
grant the transient component access to data in the composition for the specified period of time via the set of encryption keys.

11. The data access management system of claim 10, wherein the non-transitory computer-readable medium stores instructions, that when executed by the one or more processors, further cause the one or more processors to:
deny the first component access to data in the composition outside of the specified period of time.

12. The data access management system of claim 10, wherein the first component is communicatively coupled to at least one other composition.

13. The data access management system of claim 12, wherein the composition is a first server, and the at least one other composition includes a second server.

14. The data access management system of claim 13, wherein:
the second components are communicatively coupled with one another via a network; and
the second components and the first component are communicatively coupled during the specified period of time via the network.

15. The data access management system of claim 10, wherein the second components are granted access to data in the composition outside of the specified period of time.

16. The data access management system of claim 10, wherein the non-transitory computer-readable medium stores instructions, that when executed by the one or more processors, further cause the one or more processors to:
generate the encryption keys utilized by the second components at the plurality of intervals occurring during the specified period of time.

17. The data access management system of claim 10, wherein the instructions, that when executed by the one or more processors, further cause the one or more processors to generate the set of encryption keys prior to the specified period of time.

18. A non-transitory computer-readable medium comprising computer executable instructions stored, which when executed, cause a processor to:
receive an encryption key at each of a plurality of intervals from a seed value shared by a plurality of permanent components, wherein a permanent component comprises a component having access to one composition, wherein the composition comprises a group of components that form a desired computing system;
receive a request for the transient component to access data in the composition, wherein the transient component comprises a component having access to a plurality of compositions and having limited access to the seed value;
generate a matching encryption key at selected intervals of the plurality of intervals to be utilized at the transient component, wherein each matching encryption key is identical to the encryption key received for the interval;
provide the matching encryption keys to the transient component during the selected intervals; and
grant the transient component access to data in the composition for the specified period of time via the set of encryption keys.

19. The non-transitory computer-readable medium of claim 18, wherein the instructions stored, which when executed, further cause the processor to:
- deny the first component access to data in the composition outside of the specified period of time; and
- grant the plurality of second components access to data in the composition outside of the specified period of time.

20. The non-transitory computer-readable medium of claim 19, wherein:
- the first component is communicatively coupled to at least one other composition;
- the composition is a first server, and the at least one other composition includes a second server;
- the plurality of second components are communicatively coupled with one another via a network; and
- the plurality of second components and the first component are communicatively coupled during the specified period of time via the network.

* * * * *